Patented Dec. 16, 1947

2,432,542

UNITED STATES PATENT OFFICE 2,432,542

METHOD OF PRODUCING COATED CELLULOSIC SHEETS

Gilbert Pitzl, Buffalo, N. Y., assignor to E. I. du Pont de Nemours & Company, Wilmington, Del., a corporation of Delaware No Drawing. Application July 13, 1944, Serial No. 544,829

5 Claims. (Cl. 117—145)

This invention relates to moistureproof transparent sheet wrapping material. More particularly, it relates to the anchoring of moistureproof coatings to base sheets of non-fibrous cellulosic materials such as regenerated cellulose.

An object of this invention is to provide improved anchorage for moistureproof coatings on base sheets of non-fibrous, synthetic cellulosic materials. A further object is to provide enhanced anchorage and heat-sealing properties in wrapping tissues of regenerated cellulose coated with moistureproof heat-sealing compositions. A still further object is to provide an easy and economical method for incorporating an incompletely polymerized, thermosetting, hydrophobic resin in and/or on sheets of non-fibrous cellulosic material. A more specific object is to provide a method for incorporating a partially polymerized, hydrophobic melamine-formaldehyde resin in and/or on regenerated cellulose film. These and other objects will more clearly appear from the description which follows.

The expression "hydrophobic resins" and equivalent expressions are used herein to designate resins which are insoluble in water in concentrations below 35% but soluble within the range of concentrations from 35% to 70%.

In copending application Serial No. 543,727, filed July 6, 1944, there is disclosed stabilized colloidal dispersions of a partially polymerized, thermosetting, hydrophobic resin, e. g., trimethylol melamine resin, which dispersions are formed by dispersing the hydrophobic resin in a water-soluble alcohol such as glycerol and adding thereto a substantial amount of hydroxy acetic acid, preferably in aqueous solution. Unexpectedly, I have found that when non-fibrous cellulosic film such as regenerated cellulose gel film is impregnated with this dispersion, diluted to the desired concentration with water, and the dried film is coated with the usual moistureproof, heat-sealable coating, the resulting coated film shows remarkable heat-sealing and coating anchorage properties far surpassing those obtainable when resins of the same chemical composition are applied in the water-soluble stage, and moreover, these improved properties are secured with the expenditure of considerably less resin.

Accordingly, the objects above stated are accomplished by impregnating the base sheet of non-fibrous cellulosic material with the desired amount of a partially polymerized, hydrophobic melamine-formaldehyde resin dispersed in a non-basic, water-soluble alcohol from the group consisting of dihydric and trihydric alcohols, as the disperse medium, and at least 40% by weight of hydroxy acetic acid based on the weight of resin, drying the impregnated base sheet preferably under conditions which will effect final polymerization of the resin, and thereafter coating the resin-treated base sheet with a moistureproof coating in the conventional way.

The aqueous dispersion of the partially polymerized, hydrophobic melamine-formaldehyde resin may be applied to the non-fibrous cellulosic sheet by dipping or immersing the sheet in the dispersion, by spraying or brushing the dispersion on the sheet, or by applying it to the sheet by rollers or by any other convenient means. Moreover, the dispersion may be applied either to the cellulosic sheet in gel condition, or to the finished dry cellulosic sheet. In any case, the excess dispersion is removed from the sheet by squeeze rolls or any other means to secure the desired concentration of resin in the sheet.

In the preferred and simplest form of the invention, the resin is applied directly to the cellulosic sheet in gel condition. This can be done most conveniently by dispersing the hydrophobic resin in a non-basic, water-soluble di- or trihydric alcohol which is the softener for the cellulosic material, the hydroxy acetic acid is added in an amount within the range of from 0.4 to 0.6 part per part of resin to form a composition hereinafter termed "resin concentrate," and this resin concentrate is incorporated in the bath containing the softening agent in aqueous solution through which the gel film is commonly passed as it comes from the casting machine. For example, in the treatment of regenerated cellulose film a resin concentrate comprising the partially polymerized, hydrophobic melamine-formaldehyde resin dispersed in glycerol and hydroxy acetic acid may be added in proper amount to the softening bath of aqueous glycerol, and the film in gel condition is passed therethrough and subsequently dried and coated in the usual fashion.

Any partially polymerized melamine-formaldehyde resin which is in the hydrophobic state, i. e., insoluble in water in concentrations below 35% but soluble within the range of concentrations from 35–70%, may be employed for purposes of this invention. However, the trimethylol melamine resin formed by condensing about three mols of formaldehyde with one mol of melamine until the product becomes insoluble in water at concentrations below about 50% but is soluble in concentrations between 50% and 65%, is preferred.

Examples of non-basic, water-soluble alcohols particularly suitable for purposes of this invention are glycerol and ethylene glycol.

The preparation of the resin concentrate is fully disclosed in aforesaid copending application Serial No. 543,727, filed July 6, 1944. Briefly, the resin in finely divided state is stirred into the non-basic, water-soluble di- or trihydric alcohol until dispersion is complete and then the required amount of hydroxy acetic acid is added. Preferably, one part of resin is dispersed in at least two parts of non-basic, water-soluble di- or trihydric alcohol, and from about 0.4 part to 0.6 part of hydroxy acetic acid in aqueous solution is added to complete the resin concentrate.

When the resin concentrate is used in the softener bath, the concentration of resin in the bath should be such that from 0.05% to 2.0% by weight of resin, based on the weight of the dried film, is incorporated in and/or on films which are to have a normal softener content.

The softener bath may contain other modifying ingredients such as moistureproofing, surfacing, flame-proofing agents and the like so long as they do not cause precipitation of the resin.

The amount of heat required to convert the partially polymerized resin applied to the sheet of cellulosic material to the final insoluble state varies, of course, with the individual resin. From the standpoint of convenient operation and effect upon the cellulosic sheet, it is generally desirable to effect the reaction in a very few minutes at temperatures below 100° C. The necessary heat may be applied in the normal course of operation by contact with the usual heated drying rolls or other heated surface, or by subjecting the film or sheet to a heated atmosphere whereby drying of the film and conversion of the resin are effected simultaneously.

As a base, this invention contemplates any smooth, dense, substantially non-porous, non-fibrous sheet, film or tubing of regenerated cellulose whether precipitated from solutions of viscose, cuprammonium, or any other aqueous solutions or dispersions of cellulose.

The moistureproof coating may be of any composition of the type disclosed in U. S. Patent 1,826,696 (Charch and Prindle) as useful for coating regenerated cellulose and like base film to render such film moistureproof and/or heat-sealable, and will comprise in general a film-former, a wax or wax-material, a blending agent, and a plasticizer. Moistureproofness, moistureproofing, and moistureproof materials and expressions are defined in U. S. Patent 2,147,180 (Ubben). Likewise the definition of, and tests for determining the value of heat seal bond strength are set forth in U. S. Patent 2,236,546 (Mitchell). In the interest of brevity the definitions are not repeated here. The terms and expressions related thereto and employed herein are used in accordance with such definitions.

The following examples further illustrate the invention. Parts and percentage compositions throughout the specification and claims are by weight unless otherwise indicated.

Example I

A partially polymerized, hydrophobic melamine-formaldehyde resin was prepared as follows: One part of trisodium phosphate ($Na_3PO_4.12H_2O$) was dissolved in 267.6 parts of aqueous formaldehyde solution (37% formaldehyde by weight) the pH of which had been adjusted to 7.0 with 2% sodium hydroxide solution. The resulting solution was mixed with 126 parts of melamine and was heated with stirring at 86°–88° C. for about five hours at which point a test portion of the reaction mixture gave a precipitate when diluted with an equal quantity of water. The partially polymerized trimethylol melamine resin thus formed was precipitated by adding to the reaction mixture about 1600 parts of acetone, and after drying was ground to a fine powder. The resin thus formed was insoluble in water at concentrations below 35% but a 50% solution could be formed with warm water (40°–50° C.).

Ten parts of the above resin was added to 50 parts of glycerol, and the mixture was stirred until the resin was completely dispersed after which time 5 parts of hydroxy acetic acid dissolved in 35 parts of water was added to the dispersion. The resulting resin concentrate showed no tendency to precipitate resin even after dilution with water and long standing.

An aqueous bath was prepared by combining the resin concentrate with sufficient glycerol and water to form a composition consisting of 10 parts of glycerol, 0.3 part of resin, 0.15 part of hydroxy acetic acid, and 89.55 parts of water. Purified regenerated cellulose gel film was passed through the bath and thence between squeeze rolls where excess liquid was expressed to produce a film containing 0.3% resin and 25% glycerol. The film was dried for one to three minutes at a temperature of 80°–100° C. The resulting dried film was then coated with a moistureproof coating composition of the following formula:

| | Parts |
|---|---|
| Nitrocellulose (12.5% $N_2$) 10″ visc. | 6.70 |
| Paraffin wax (M. P. 60° C.) | 0.15 |
| Dibutyl phthalate | 2.90 |
| Damar | 1.50 |
| Ethyl alcohol | 2.90 |
| Acetone | 1.45 |
| Water | 0.30 |
| Ethyl acetate | 51.00 |
| Toluene | 33.10 | and the solvent was removed in the usual manner.

The resulting product is a sheet of regenerated cellulose with a moistureproofing coating which is substantially odorless, transparent, flexible, and moistureproof, and to which the moistureproof coating adheres or is anchored very tenaciously when in direct contact with water and, in addition, has an improved heat seal strength.

Example II

Purified regenerated cellulose gel film is passed, as in Example I, through a bath of the following composition:

| | Parts |
|---|---|
| Glycerol | 10.00 |
| Resin 607* | 0.30 |
| Hydroxy acetic acid | 0.15 |
| Water | 89.55 |

* Trade name used by American Cyanamid Company to designate the partially polymerized, hydrophobic resin obtainable by condensing about three mols of formaldehyde with one mol of melamine, insoluble in water at concentrations below 35% but soluble in 60% concentration in hot water (80°–100° C.).

and the impregnated film was dried and coated as in Example I.

The resulting product exhibited the same properties which have been described for the coated film of Example I.

Example III

Following the procedure of Example I a purified regenerated cellulose gel film was impregnated with the following composition:

| | Parts |
|---|---|
| Ethylene glycol | 10.00 |
| *Melmac S–77–V | 0.30 |
| Hydroxy acetic acid | 0.15 |
| Water | 89.55 |

* Melmac S–77–V is a hydrophobic melamine-formaldehyde resin marketed by American Cyanamid Company, which resin is insoluble in water at concentrations below 35% but is soluble in both cold and warm water at concentrations in the range of from 35%–70%.

and after drying was coated as in Example I.

The resulting moistureproof sheet had substantially the same characteristics ascribed to the coated sheet of Example I.

It will be apparent from the foregoing that this invention provides improved anchorage and heat-sealing properties for coated sheets of regenerated cellulose and the like. A further advantage of considerable importance is that the improvement in anchorage and heat-seal strength is effected with the use of substantially less resin than was required in previous processes. Moreover, because the acid necessary to polymerize the resin to the final insoluble stage is also an excellent softener for cellulose and is used in sufficient quantity to produce substantially complete polymerization in a short time and at relatively low temperatures, a product of highest quality results. And, too, since the resin is generally dispersed in the softening agent, and is applicable to the sheet therewith, it is evident that the process of this invention does not involve added equipment and the resin treatment can be integrated into the present day procedures without substantially slowing or disturbing the continuity of such procedures.

As many apparently widely different embodiments of this invention may be made without departing from the spirit and scope thereof, it is to be understood that this invention is not limited to the specific embodiments thereof except as defined in the appended claims.

I claim:

1. In a process for producing a moistureproofed wrapping tissue wherein a thermosetting, partially polymerized, synthetic resin is first applied to a base film of non-fibrous cellulosic material, is then reacted to the final insoluble stage, and the resulting resin-containing base film is thereafter coated with a moistureproofing coating of the type comprising a cellulose derivative, a wax and a solvent for the cellulose derivative and wax, the improvement which comprises applying to the cellulosic base film as the thermosetting resin, a partially polymerized, hydrophobic melamine-formaldehyde resin insoluble in water in concentrations below 35% but soluble within the range of concentration from 35% to 70% dispersed in a medium comprising essentially a non-basic, water-soluble alcohol from the group consisting of dihydric and trihydric alcohols, and at least 40% by weight of hydroxy acetic acid based on the weight of resin, and then heating said base sheet to convert said partially polymerized melamine-formaldehyde resin to the final insoluble stage.

2. In a process for producing a moistureproofed wrapping tissue wherein a thermosetting, partially polymerized, synthetic resin is first applied to a base film of non-fibrous cellulosic material, is then reacted to the final insoluble stage, and the resulting resin-containing base film is thereafter coated with a moistureproofing coating of the type comprising a cellulose derivative, a wax and a solvent for the cellulose derivative and wax, the improvement which comprises applying to the cellulosic base film as the thermosetting resin, a partially polymerized, hydrophobic melamine-formaldehyde resin insoluble in water in concentrations below 35% but soluble within the range of concentration from 35% to 70% dispersed in a medium comprising essentially a water-soluble alcohol from the group consisting of dihydric and trihydric alcohols, water, and from 0.4 to 0.6 part by weight of hydroxy acetic acid per part of resin, and then heating said base sheet to convert said partially polymerized melamine-formaldehyde resin to the final insoluble stage.

3. In a process for producing a moistureproofed wrapping tissue wherein a thermosetting, partially polymerized, synthetic resin is first applied to a base film of nonfibrous cellulose material in the gel state, is then reacted to the final insoluble stage, and the resulting resin-containing base film is thereafter coated with a moistureproofing coating of the type comprising a cellulose derivative, a wax and a solvent for the cellulose derivative and wax, the improvement which comprises applying to the cellulosic base gel film a partially polymerized, hydrophobic melamine-formaldehyde resin insoluble in water in concentrations below 35% but soluble within the range of concentration from 35% to 70% dispersed in a medium comprising essentially glycerol, water and from 0.4 to 0.6 part by weight of hydroxy acetic acid per part of resin, and then heating said base sheet to convert said partially polymerized melamine-formaldehyde resin to the final insoluble stage.

4. In a process for producing a moistureproofed wrapping tissue wherein a thermosetting, partially polymerized, synthetic resin is first applied to a base film of non-fibrous cellulose material in the gel state, is then reacted to the final insoluble stage, and the resulting resin-containing base film is thereafter coated with a moistureproofing coating of the type comprising a cellulose derivative, a wax and a solvent for the cellulose derivative and wax, the improvement which comprises applying to the cellulosic base gel film from 0.05% to 2.0% by weight, based on the weight of dried film, of a partially polymerized, hydrophobic melamine-formaldehyde resin insoluble in water in concentrations below 35% but soluble within the range of concentration from 35% to 70% dispersed in a medium comprising essentially a water-soluble alcohol from the group consisting of dihydric and trihydric alcohols, water, and from 0.4 to 0.6 part by weight of hydroxy acetic acid per part of resin, and then heating said base sheet to convert said partially polymerized melamine-formaldehyde resin to the final insoluble stage.

5. In a process for producing a moistureproofed wrapping tissue wherein a thermosetting, partially polymerized, synthetic resin is first applied to a base film of non-fibrous regenerated cellulose, is then reacted to the final insoluble stage, and the resulting resin-containing base film is thereafter coated with a moistureproofing coating of the type comprising a cellulose derivative, a wax and a solvent for the cellulose derivative and wax, the improvement which comprises applying to the regenerated cellulose base film as the thermosetting resin, from 0.05% to 2.0% by weight, based on the weight of dried film, of a partially polymerized, hydrophobic trimethylol melamine resin insoluble in water in concentrations below 35% but soluble within the range of concentration from 35% to 70% dispersed in a medium comprising essentially glycerol, water, and from 0.4 to 0.6 part by weight of hydroxy acetic acid per part of resin, and then heating said base sheet to convert said partially polymerized melamine-formaldehyde resin to the final insoluble stage.

GILBERT PITZL.

REFERENCES CITED

The following references are of record in the file of this patent:

UNITED STATES PATENTS

| Number | Name | Date |
| --- | --- | --- |
| 2,122,433 | Meigs | July 5, 1938 |
| 2,159,007 | Charch et al. | May 23, 1939 |
| 2,300,881 | Erickson et al. | Nov. 3, 1942 |
| 2,364,726 | Landolt et al. | Dec. 12, 1944 |